United States Patent
Vannatta et al.

(10) Patent No.: US 6,959,170 B2
(45) Date of Patent: Oct. 25, 2005

(54) COMMUNICATIONS RECEIVERS AND METHODS THEREFOR

(75) Inventors: Louis Vannatta, Crystal Lake, IL (US); David Haub, Lake in The Hills, IL (US); John Solar, Algonquin, IL (US)

(73) Assignee: Motorola, Inc., Schamburg, IL (US)

( * ) Notice: Subject to any disclaimer, the term of this patent is extended or adjusted under 35 U.S.C. 154(b) by 446 days.

(21) Appl. No.: 10/033,999

(22) Filed: Dec. 20, 2001

(65) Prior Publication Data

US 2003/0119450 A1 Jun. 26, 2003

(51) Int. Cl.$^7$ .............................................. H04B 17/00
(52) U.S. Cl. .................. 455/67.11; 455/67.13; 455/296; 455/340; 455/307; 455/311; 455/226.2; 455/226.3
(58) Field of Search .................. 455/67.11, 67.13, 455/63.1, 134, 135, 190.1, 226.1, 296, 340, 455/307, 311, 295, 226.2, 226.3

(56) References Cited

U.S. PATENT DOCUMENTS

| | | | |
|---|---|---|---|
| 5,179,730 A | | 1/1993 | Loper |
| 5,507,036 A | | 4/1996 | Vagher |
| 5,579,347 A | | 11/1996 | Lindquist et al. |
| 5,809,399 A | * | 9/1998 | Tuutijarvi et al. ......... 455/63.1 |
| 5,894,499 A | | 4/1999 | Katayama et al. |
| 6,029,058 A | * | 2/2000 | Namgoong et al. ......... 455/324 |
| 6,047,171 A | | 4/2000 | Guey et al. |
| 6,125,272 A | | 9/2000 | Bautista et al. |
| 6,178,314 B1 | | 1/2001 | Difiore et al. |
| 6,192,225 B1 | * | 2/2001 | Arpaia et al. ............. 455/196.1 |
| 6,397,061 B1 | * | 5/2002 | Jordan et al. ................ 455/421 |
| 6,404,832 B2 | * | 6/2002 | Abe ............................ 375/350 |
| 6,507,733 B1 | * | 1/2003 | Krupezevic et al. ......... 455/324 |
| 6,516,183 B1 | * | 2/2003 | Hellmark ....................... 455/78 |
| 6,553,229 B1 | * | 4/2003 | Dent ........................... 455/434 |
| 6,574,462 B1 | * | 6/2003 | Strange ........................ 455/318 |
| 6,603,826 B1 | * | 8/2003 | Cupo et al. ................... 375/346 |
| 6,683,919 B1 | * | 1/2004 | Olgaard et al. .............. 375/316 |
| 6,711,398 B1 | * | 3/2004 | Talaie et al. ................. 455/403 |
| 6,718,166 B2 | * | 4/2004 | Cordone et al. ............. 455/306 |
| 6,816,716 B2 | * | 11/2004 | Shohara .................... 455/196.1 |

OTHER PUBLICATIONS

"The DYNAS-reception Concept", 2421 Radio Fernsehen Elektronik 41 (1992) No. 2, Berlin , DD 8 pages.

* cited by examiner

Primary Examiner—Marceau Milord
(74) Attorney, Agent, or Firm—Roland K. Bowler, II

(57) ABSTRACT

A method in a radio communication device having a receiver receiving a wideband signal in the presence of narrowband blockers method in direct conversion and intermediate frequency RF receivers including determining power for signal distortion products (40), determining power for a desired signal and the distortion products (41), filtering the signal distortion products with a filter having a bandwidth of rejection, and dynamically adjusting a rejection property (43) as a function of the power for both the desired signal and the signal distortion products. In some embodiments, a determination is made whether a ratio of powers exceeds a threshold (45) as a condition for adjusting the rejection property.

27 Claims, 3 Drawing Sheets

COMMUNICATIONS RECEIVERS AND METHODS THEREFOR

FIELD OF THE INVENTIONS

The present inventions relate generally to communications receivers, and more particularly to receivers having reduced intermodulation distortion for mobile communications handsets, combinations thereof and methods therefor.

BACKGROUND OF THE INVENTIONS

Direct conversion receivers convert signals directly to baseband for subsequent processing and thus eliminate the use of converters and intermediate filters typical of other receivers, for example those of superheterodyne receivers. Intermediate frequency receivers, for example very low intermediate frequency (VLIF) receivers, convert signals to an intermediate frequency for processing before converting to baseband.

Direct conversion receivers are less complex and less costly relative to intermediate frequency receivers, and thus there is a strong desire to implement direct conversion receivers in communications devices, for example in mobile cellular communications handsets.

The Universal Mobile Telecommunications Service (UMTS) wide band code division multiple access (WCDMA) communication standard has frequency spectrum allocated exclusively to WCDMA communications. The exclusively allocated WCDMA frequency spectrum is substantially devoid of narrow band blockers. Other non-exclusively allocated frequency bands used for WCDMA communications, however, are subject to high-level narrow-band blockers, which produce $2^{nd}$ and higher order intermodulation distortion products, which degrade receiver performance.

The distortion may be mitigated in direct conversion receivers with a high $2^{nd}$ order intercept mixer, as described for example in U.S. Pat. No. 6,192,225 entitled "Direct Conversion Receiver" and in U.S. Pat. No. 6,125,272 entitled "Method And Apparatus Improved Intermodulation Distortion Protection", and by baseband frequency filtering, but these techniques are often insufficient for many applications.

Distortion may be reduced in intermediate frequency receivers by filtering the signal before conversion to baseband. Filtering before conversion to baseband however works well only for applications where the baseband sampling rate is sufficient to accommodate the intermediate frequency offset and where adjacent channel rejection requirements are less severe.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
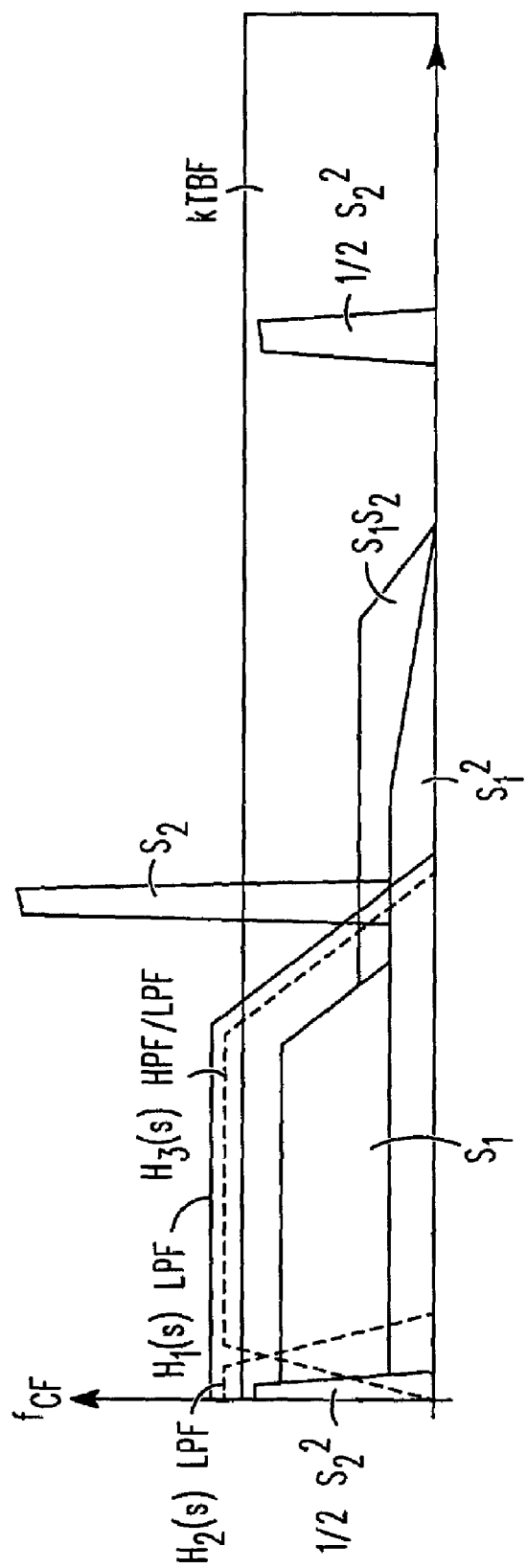
FIG. 1 is frequency domain graphical illustration of various signals and signal components in the receivers of the present invention.
Figure 2:
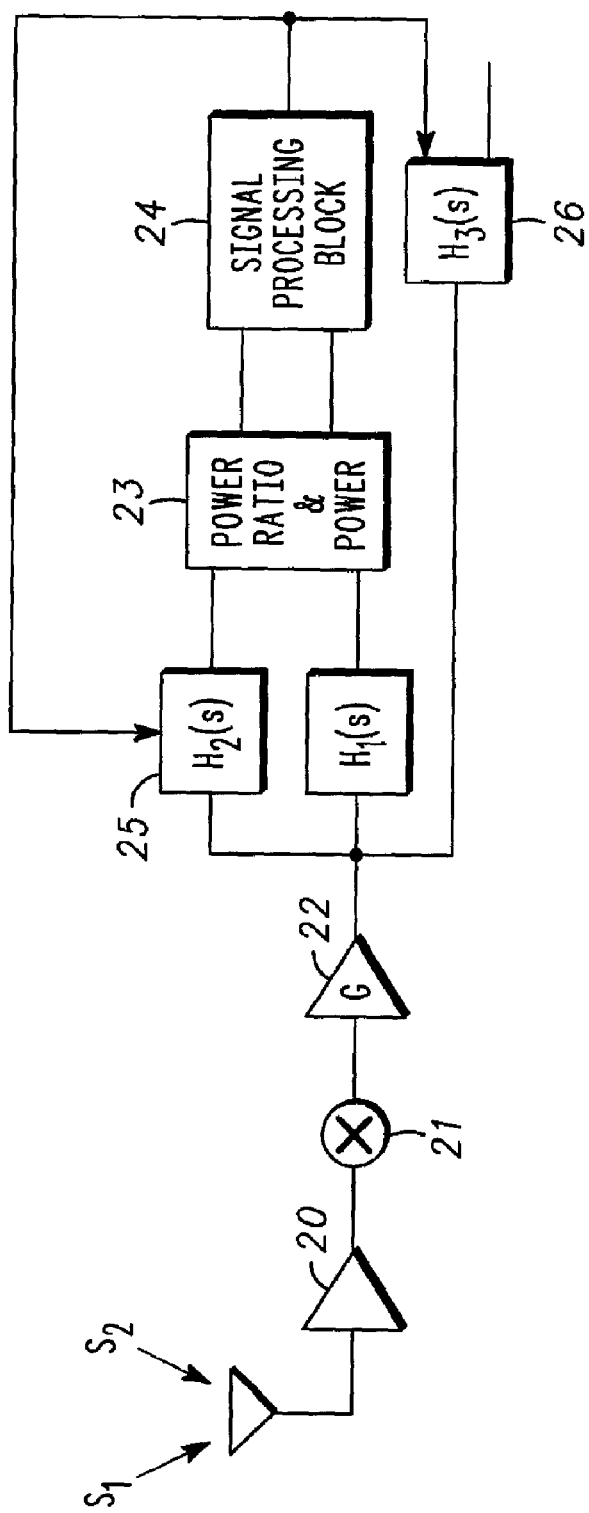
FIG. 2 is an exemplary RF receiver schematic block diagram according to an exemplary embodiment of the invention.

FIG. 1 illustrates various input signals and filter responses for a non-linear receiver illustrated in the block circuit diagram of FIG. 2. The signal ($S_1$) is a desired signal and the signal ($S_2$) is an interference signal, or a blocker, which when received and processed by the non-linear receiver produces distortion, for example $2^{nd}$ and higher order intermodulation distortion products.

Figure 3:
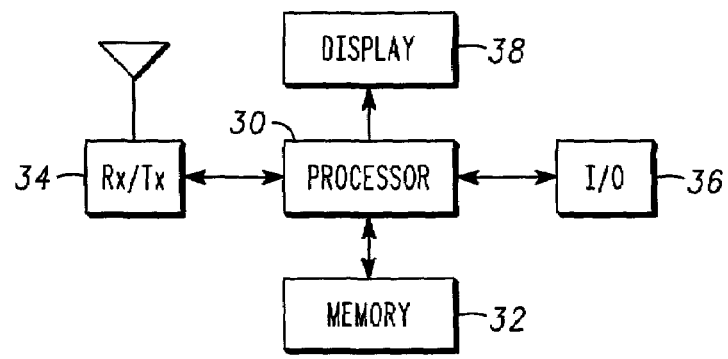
FIG. 3 is an exemplary radio communication device having a receiver for performing the methods of the present invention.

In one exemplary embodiment, the receiver is implemented as either a direct conversion or intermediate frequency receiver, for example a very low intermediate frequency (VLIF) receiver, in a radio communication device illustrated in FIG. 3. The exemplary radio communication device comprises generally a processor 30 coupled to memory 32, a transmitter/receiver 34, input/output devices 36 and a display 38, and in one embodiment the radio communication device is a cellular communication handset.

In FIG. 2, the desired signal ($S_1$) and the blocker ($S_2$) are received at an antenna coupled to an amplifier stage 20, which is coupled to a mixer 21 and thereafter a non-linear stage 22. As noted, signal distortion products are produced by the blocker signal at the mixer and non-linear stages of the receiver.

Generally, the signal distortion products include narrowband and wideband intermodulation distortion products. In one exemplary mode of operation, the radio communication handset receiver receives a wideband signal in the presence of narrowband blockers, for example by receiving in WCDMA band susceptible to GSM narrowband blockers. In this exemplary application, it is desirable to suppress the narrowband blockers. More generally, however, the methods of the invention may be used to suppress any distortion products.

FIG. 1 illustrates two $2^{nd}$ order distortion products (½ $S_2^2$), one of which is within the desired signal bandwidth at or near the center frequency $f_{CF}$. In a direct conversion receiver, the center frequency ($f_{CF}$) is 0 Hz, but the center frequency could be at any frequency, for example that typical of an intermediate conversion receiver. FIG. 1 also illustrates thermal noise (kTBF), which is pervasive.

FIG. 1 illustrates the passband ($H_1$) for a first filter, which is a low pass filter (LPF) in the exemplary embodiment of FIGS. 1 and 2, passing the desired signal ($S_1$) and an undesired distortion product, which is a lower band $2^{nd}$ order distortion product (½ $S_2^2$) in the exemplary embodiment.

Figure 4:
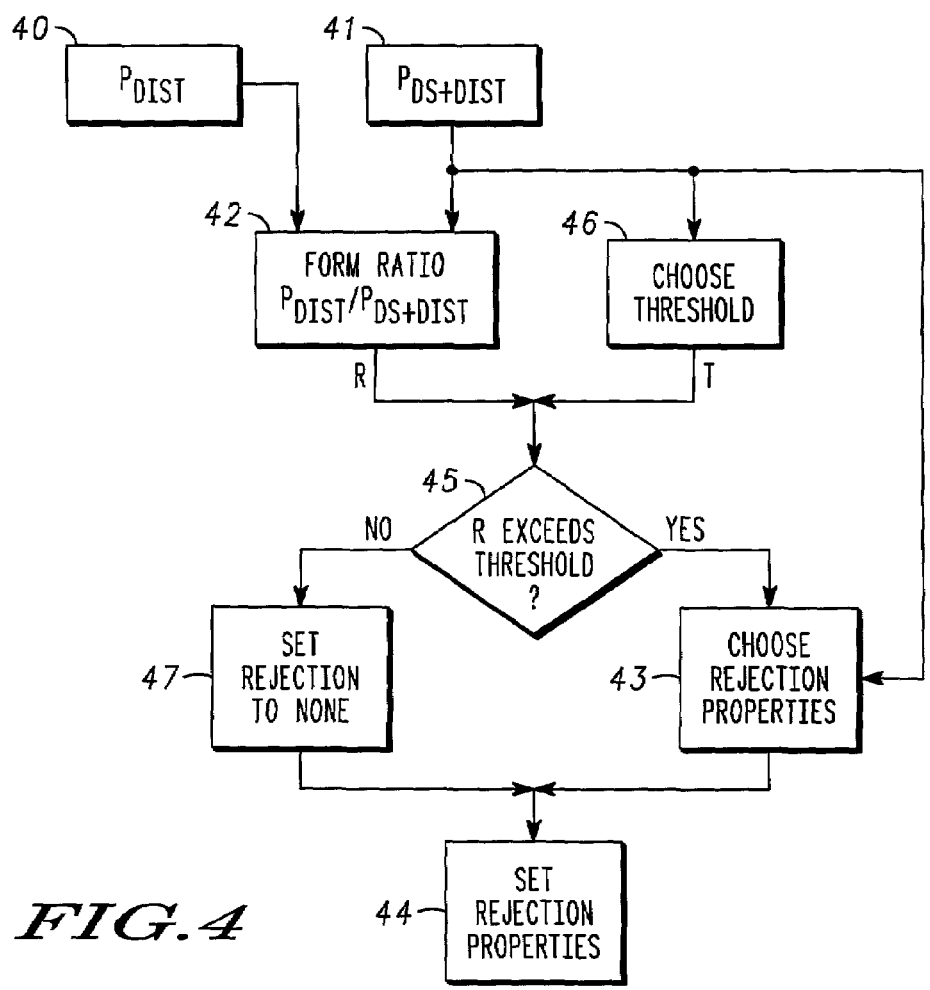
FIG. 4 is an exemplary flow diagram for a process in an RF receiver.

In one embodiment of the invention, illustrated in the process flow diagram of FIG. 4, at block 40, power ($P_{DIST}$) is determined for the undesired signal distortion products within the passband of the desired signal $S_1$. In the exemplary embodiment, the distortion product is the lower band $2^{nd}$ order intermodulation distortion product (½ $S_2^2$) illustrated in FIG. 1. In other embodiments, the power of other undesired distortion products in the first filter passband ($H_1$) may also be determined.

In FIG. 4, at block 41, power ($P_{DS+DIST}$) for both the desired signal and the undesired distortion products is also determined. In FIG. 2, power determinations including ($P_{DS}$) and ($P_{DS+DIST}$), are made at receiver circuit block 23.

Generally, the distortion products are filtered by dynamically selecting one or more filter properties. In one embodiment, for example, the distortion products are filtered by dynamically adjusting the bandwidth of rejection of an infinite impulse response (IIR) filter by selecting corner frequencies, and in another embodiment the distortion products are filtered by dynamically adjusting the rejection of a finite impulse response (FIR) filter by controlling filter coefficients, without adjusting the bandwidth of rejection. In other embodiments, both the bandwidth of rejection and the rejection of the filter are adjusted dynamically. In other alternative embodiments, the properties of other filters may be adjusted dynamically.

In the exemplary embodiment of FIGS. 1 and 2, the distortion products are filtered by a second filter having a second passband ($H_2$) and a third filter having a third passband ($H_3$). In FIGS. 1 and 2, the second filter passband is that of a low pass filter and the third passband is that of a band-pass filter. In other embodiments, however other filters and/or filter passband combinations may be used alternatively, for example a single filter may be used. Dynamic adjustment of the filter rejection occurs at digital signal processing block, for example block 24 in FIG. 2.

Generally, the rejection properties of the filter are adjusted dynamically as a function of the power for both the desired signal and the undesired signal distortion products, ($P_{DS+DIST}$). In FIG. 4, at block 43, the rejection properties, for example the bandwidth of rejection of the filter rejection is selected based upon the power ($P_{DS+DIST}$), for example from a look-up table stored in memory on the receiver. In the exemplary circuit of FIG. 2, for example, the corner frequencies of the second filter passband ($H_2$) and the third filter passband ($H_3$) are selected at block 43 in FIG. 4. In FIG. 2, a signal processing block 24 provides bandwidth or rejection frequency control signals to second and third filter blocks 25 and 26 based on the power ($P_{DS+DIST}$) determined at block 23.

In one embodiment, in FIG. 4, at block 45, a determination is made whether a ratio of powers exceeds a predetermined threshold. The ratio of powers, determined at block 42, is the power for the signal distortion products ($P_{DS}$) divided by the power for both the desired signal and the signal distortion products ($P_{DS+DIST}$). In the exemplary embodiment of FIG. 2, the ratio of powers power ($P_{DS}/P_{DS+DIST}$) is determined at block 23. At block 47, the filter rejection properties are selected based upon whether the ratio of powers is above the predetermined threshold, as determined at block 45, in FIG. 4. The threshold is selected at block 46 and is a function the power ($P_{DS+DIST}$), for example from a set of thresholds stored in a look-up table.

In one embodiment where the ratio of powers is compared to the threshold at block 45, the filter rejection properties is set equal to none, at block 47 in FIG. 4, for example, the bandwidth of rejection or the rejection is set to zero, if the ratio of powers is not above the predetermined threshold.

In another embodiment where the ratio of powers is compared to the threshold at block 45, the rejection properties are set at a fixed value, for example a fixed bandwidth of rejection or fixed filter rejection, at block 43 if the ratio of powers is above the predetermined threshold. In another embodiment, the rejection properties are adjusted dynamically at block 43 when the ratio of powers is above the predetermined threshold.

In other embodiments, the filter rejection properties are adjusted dynamically without regard for whether the power ratio exceeds the threshold. In this embodiment, the rejection properties are selected at block 43 in FIG. 4 based upon the power of both the desired signal and the distortion products, ($P_{DS+DIST}$) In FIG. 4, the rejection properties are set at block 44.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in direct conversion and intermediate frequency RF receivers having a signal with a desired signal portion and a distortion products portion, comprising:
   determining a ratio of powers,
   the ratio of powers is power of the signal distortion products divided by power of both the desired signal and the signal distortion products;
   determining whether the ratio of powers exceeds a predetermined threshold;
   filtering the signal distortion products with a filter having a non-zero bandwidth of rejection if the ratio of powers is above the predetermined threshold.

2. The method of claim 1, filtering the signal distortion products with the filter having a bandwidth of rejection equal to zero if the ratio of powers is not above the predetermined threshold.

3. The method of claim 1, dynamically adjusting the bandwidth of rejection of the filter as a function of the power for both the desired signal and the signal distortion products.

4. The method of claim 3, dynamically adjusting the bandwidth of rejection by selecting a bandwidth of rejection value from a look-up table for a particular power for both the desired signal and the signal distortion products.

5. The method of claim 3, dynamically adjusting the predetermined threshold as a function of the power for both the desired signal and the signal distortion products.

6. The method of claim 1, dynamically adjusting the predetermined threshold as a function of the power for both the desired signal and the signal distortion products.

7. The method of claim 1, the signal distortion products include narrowband intermodulation distortion products, determining power for the signal distortion products by determining power for the narrowband intermodulation distortion products.

8. The method of claim 7, dynamically adjusting the bandwidth of rejection of the filter as a function of the power for both the desired signal and the signal distortion products.

9. The method of claim 1, dynamically adjusting rejection of the filter as a function of the power for both the desired signal and the signal distortion products.

10. A method in direct conversion and intermediate frequency RF receivers, comprising:
    determining power for a desired signal;
    determining power for signal distortion products;
    filtering the signal distortion products with a filter;
    dynamically adjusting a bandwidth of rejection of the filter as a function of the power for both the desired signal and the signal distortion products.

11. The method of claim 10, dynamically adjusting the bandwidth of rejection by selecting a bandwidth of rejection value from a look-up table for a particular power for both the desired signal and the signal distortion products.

12. The method of claim 10,
   determining whether a ratio of powers exceeds a predetermined threshold, the ratio of powers is the power for the signal distortion products divided by the power for both the desired signal and the signal distortion products;
   setting the bandwidth of rejection equal to zero if the ratio of powers does not exceed the predetermined threshold.

13. The method of claim 12, dynamically adjusting the predetermined threshold as a function of the power for both the desired signal and the signal distortion products.

14. The method of claim 10, the signal distortion products include narrowband intermodulation distortion products, determining power for the signal distortion products by determining power for the narrowband intermodulation distortion products.

15. The method of claim 10, dynamically adjusting rejection of the filter as a function of the power for both the desired signal and the signal distortion products.

16. A method in direct conversion and intermediate frequency RF receivers, comprising:
   determining power for signal distortion products;
   determining power for a desired signal;
   filtering the signal distortion products with a filter;
   dynamically adjusting a rejection of the filter as a function of the power for both the desired signal and the signal distortion products.

17. The method of claim 15,
   determining whether a ratio of powers exceeds a predetermined threshold, the ratio of powers is the power for the signal distortion products divided by the power for both the desired signal and the signal distortion products;
   setting the rejection of the filter equal to zero if the ratio of powers does not exceed the predetermined threshold.

18. The method of claim 17, dynamically adjusting the predetermined threshold as a function of the power for both the desired signal portion and the signal distortion products.

19. The method of claim 15, the signal distortion products include narrowband intermodulation distortion products, determining power for the signal distortion products by determining power for the narrowband intermodulation distortion products.

20. A method in radio communications devices having a receiver receiving a wideband signal in the presence of narrowband blockers, comprising:
   determining power for narrowband intermodulation distortion products;
   determining power for a desired signal;
   filtering the desired signal and distortion products;
   dynamically adjusting at least one of a bandwidth of rejection and rejection of the filter as a function of the power for both the desired signal and the narrowband intermodulation distortion products.

21. The method of claim 20,
   determining whether a ratio of powers exceeds a predetermined threshold,
   the ratio of powers is the power for the narrowband intermodulation distortion products portion divided by the power for both the narrowband intermodulation distortion products and the desired signal;
   setting the at least one of the bandwidth of rejection and the rejection of the filter to a non-zero value if the ratio of powers is above the predetermined threshold.

22. The method of claim 21, setting the at least one of the bandwidth of rejection and the rejection of the filter to zero if the ratio of powers is not above the predetermined threshold.

23. The method of claim 21, dynamically adjusting the predetermined threshold as a function of the power for both the desired signal portion and the signal distortion products.

24. A method an RF receiver, comprising:
   determining power for a signal distortion product;
   determining power for a desired signal;
   filtering the signal distortion product and the desired signal with a filter;
   dynamically adjusting a filter rejection property as a function of the power for both the desired signal and the signal distortion products.

25. The method of claim 24,
   determining whether a ratio of powers exceeds a predetermined threshold, the ratio of powers is the power for the signal distortion products divided by the power for both the desired signal and the signal distortion products;
   dynamically adjusting a filter rejection property only if the ratio of powers is above the predetermined threshold.

26. The method of claim 25, dynamically adjusting the predetermined threshold as a function of the power for both the desired signal portion and the signal distortion products.

27. The method of claim 24, the signal distortion products include narrowband intermodulation distortion products, determining power for the signal distortion products by determining power for the narrowband intermodulation distortion products.

* * * * *